United States Patent [19]

Pastor et al.

[11] Patent Number: 4,465,656
[45] Date of Patent: Aug. 14, 1984

[54] PROCESS FOR PREPARATION OF WATER-FREE OXIDE MATERIAL

[75] Inventors: Ricardo C. Pastor, Manhattan Beach; Antonio C. Pastor, Santa Monica; Luisa E. Gorre, Oxnard; Remedios K. Chew, Canoga Park, all of Calif.

[73] Assignee: Hughes Aircraft Company, El Segundo, Calif.

[21] Appl. No.: 481,592

[22] Filed: Apr. 4, 1982

Related U.S. Application Data

[62] Division of Ser. No. 294,581, Aug. 19, 1981.

[51] Int. Cl.$^3$ .................. C01B 33/18; C01G 17/02
[52] U.S. Cl. ............................ 423/339; 423/335;
423/263; 423/592; 423/593; 423/600; 423/618;
423/625; 423/630; 501/53; 65/33; 423/608;
423/610
[58] Field of Search ............... 423/263, 335, 592, 618,
423/339

[56] References Cited

U.S. PATENT DOCUMENTS 2,904,713 9/1959 Herasus et al. .
3,275,408 9/1966 Winterburn .
3,535,890 10/1970 Hansen et al. .
4,315,832 2/1982 Pastor et al. ...................... 423/263

*Primary Examiner*—Herbert T. Carter
*Attorney, Agent, or Firm*—Mary E. Lachman; A. W. Karambelas

[57] ABSTRACT

The specification discloses new and improved processes for forming water-free metal or non-metal oxide materials, which may then be melted and formed into optical components in vitreous or crystal form, which are free of the hydrogen-impurity absorption in the near infrared wavelength range. In one process, a water-free oxide is prepared by reacting a chosen nonpolar compound containing the desired metal or non-metal with an aprotic oxygen-containing compound to form the oxide as a precipitate in a chosen aprotic nonaqueous liquid solvent which provides a water-free environment during the formation of the oxide, to prevent the inclusion of water and water-derived impurities in the oxide as formed. Then the oxide-containing precipitate is subjected to a reactive atmosphere process by exposing the powder to a chosen gas phase reactive atmosphere comprising atomic halogen at a predetermined elevated temperature for a predetermined period of time, to remove traces of water and water-derived impurities from the oxide.

5 Claims, 7 Drawing Figures

PROCESS FOR PREPARATION OF WATER-FREE OXIDE MATERIAL

This is a division of application Ser. No. 294,581, filed Aug. 19, 1981.

BACKGROUND OF THE INVENTION

1. Field of the Invention

This invention relates generally to the field of oxides of metals and non-metals and, more particularly, to processes for the preparation of such oxide materials which are water-free, and for the formation of optical components from such water-free oxide materials, which transmit radiation in the near infrared wavelength region.

2. Description of the Prior Art

Metal and non-metal oxides and particularly oxide glasses, such as silicates, phosphates, and borates, are frequently used to form optical components, such as windows and lenses, in optical systems requiring the transmission of radiation of a particular wavelength. However, it is known that polyatomic impurities degrade the optical transparency of the host material in the near-infrared radiation range (i.e. 0.75 to 2.5 micrometers). This effect has been studied in detail with regard to alkali halide crystals, as discussed by C. J. Duthler in the publication entitled "Extrinsic absorption in 10.6-$\mu$m-laser-window materials due to molecular-ion impurities," in the *Journal of Applied Physics*, Vol. 45, 1974, pages 2668–2671, and in U.S. Pat. No. 3,932,597, assigned to the present assignee. In addition, this degraded optical transparency in the near-infrared range has been observed in oxide materials as well. In particular, water vapor poses a difficult problem because this species is an ubiquitous impurity that is often uncontrolled in all phases of materials preparation and processing. The impurities derived from water, namely, hydroxyl ions and hydrogen ions, degrade the near-infrared transmission of oxides, as discussed, for example, in the book entitled "Ultrapurity Methods and Techniques", edited by M. Zief and R. Speights, Marcel Dekker Inc., 1972, at pages 330–331, and the publication entitled "Water Content and Infrared Transmission of Simple Glasses" by Anna J. Harrison, in the *Journal of the American Ceramic Society*, Vol. 30, No. 12, 1947, pages 362–366.

Conventional methods for preparing metal oxides yield a product which has a substantial concentration of hydrogen impurities. For example, an oxysalt, such as a sulfate, nitrate, or cabonate may be prepared by the reaction of calcium hydroxide and sulfuric, nitric, or carbonic acid, respectively, in a water-rich medium, and the oxysalt may then be calcined (i.e. heated under oxidizing conditions). For example, calcium carbonate is calcined to calcium oxide and carbon dioxide. In another known process for forming metal oxides, the free metal may be combusted in air, which invariably contains water. In still another known process, a metal oxide may be formed by hydrolysis of a metal halide, followed by calcination to the oxide. These preparative methods discussed above are well-known and are described in the book entitled "Treatise in Inorganic Chemistry" by H. Remy, translated by J. S. Anderson and edited by J. Kleinberg, Elsevier, 1956. In all of the above-described processes, the oxide is exposed to an environment containing water, which becomes incorporated in the oxide. Even when these oxides are calcined, the oxide is exposed to water in the surroundings, such as water resulting from continuous outgassing from the walls of the apparatus used.

It is the alleviation of this prior art problem of the degraded optical transparency of oxides in the near infrared range due to water impurities to which the present invention is directed.

In the particular case of fused silica, (i.e. silicon dioxide in the amorphous of vitreous state), there have been attempts to solve this prior art problem mentioned above by forming a fused silica material with negligible free-hydroxyl content. For example, the vapor-phase hydrolysis or oxidation of silicon compounds in a flame yields 0.12 weight percent free-hydroxyl in silica. In addition, flame fusion of a quartz crystal yields 0.04 weight percent free-hydroxyl, while electrical fusion of quartz crystal powder yields 0.0003 weight percent free-hydroxyl. The values listed above are presented in the article entitled "Water in vitreous silica: Part I. Influence of water content on the properties of vitreous silica", by G. Hetherington and K. H. Jack, in *Physics and Chemistry of Glasses*, Vo. 3, No. 4, 1962, pages 129–133. However, the latter two processes use quartz which is usually from a natural source and therefore of limited supply and relatively costly. In addition, these approaches for forming fused silica as described above are forced to resort to energy-intensive processes requiring relatively high temperatures and long dwell times, because of the slowness of the rate by which the hydroxyl species are eliminated by the outgas of water vapor.

The present invention is further directed to providing a fused silica material which is free of water impurities by a process which is free from reliance on costly starting materials and high energy inputs as are required in the prior art processes discussed immediately above.

SUMMARY OF THE INVENTION

The purpose of the present invention is to provide new and improved processes for preparing water-free oxide materials.

In order to accomplish this purpose, we have discovered and developed a process for removing water and water-derived impurities from an oxide powder by exposing the powder to a chosen gas phase reactive atmosphere comprising atomic halogen for a predetermined period of time at a predetermined elevated temperature to produce a chemical reaction with and removal of the water impurities in the powder.

In addition, the above-described purpose of the present invention may be accomplished by a second process embodiment in which a chosen nonpolar compound containing the metal or non-metal to be converted to the oxide is reacted with a chosen aprotic oxygen-containing compound to form an oxide-containing precipitate, in a chosen aprotic nonaqueous liquid solvent which provides a water-free environment during the formation of the oxide, to prevent the inclusion of water-derived impurities in the precipitate. Next, the oxide precipitate is separated from the solvent under water-free conditions. Then, the precipitate of the oxide is exposed to a chosen gas phase reactive atmosphere comprising atomic halogen for a predetermined period of time at a predetermined elevated temperature to produce a chemical reaction with and remove traces of water and water-derived impurities from the precipitate, to provide a water-free oxide material.

The purpose of the present invention may be further accomplished by a third process embodiment in which there is first provided a starting material comprising a selected organic compound containing a number of oxygen-containing groups which are bonded through the oxygen atoms to a single atom of the metal or non-metal to be formed into the oxide. This starting material is reacted with a chosen organic acid anhydride which is capable of replacing the first oxygen-containing groups of the starting material with second oxygen-containing groups derived from the anhydride, to form an unstable intermediate product. The intermediate product is subsequently decomposed to form the desired oxide and the acid anhydride, with the latter reacting with and removing traces of water and water-derived impurities during the formation of the desired oxide. Thus, the oxide so formed is free of water.

Accordingly, it is a purpose of the present invention to provide a new and improved process for removing water and water-derived impurities from an oxide powder.

Another purpose of the present invention is to form an oxide material by a process which prevents the inclusion of water-derived impurities in the oxide.

Still another purpose of the present invention is to provide oxide materials that are free of hydrogen impurities and that are optically transmissive in the near-infrared radiation range.

Another purpose is to provide water-free fused silica from a starting material other than naturally occurring quartz.

A further purpose of the present invention is to provide an optical component which is transmissive to radiation in the near-infrared range.

Yet another purpose of the present invention is to provide a new and improved fused cristobalite material and a process for forming this material.

Further, in conjunction with the above-described purposes of the present invention, it has been discovered that one process embodiment of the present invention may be used to form a water-free rare earth oxychloride powder from a rare earth oxide powder.

A feature of the present invention is that there is provided a new form of α-cristobalite powder having increased thermal stability.

Another feature of the present invention is that a controlled reactive atmosphere is used in one embodiment thereof.

The foregoing and other advantages and features of the present invention will be apparent from the following more particular description of the preferred embodiments of the invention, as illustrated in the accompanying drawings.

DETAILED DESCRIPTION OF THE INVENTION

Figure 1:
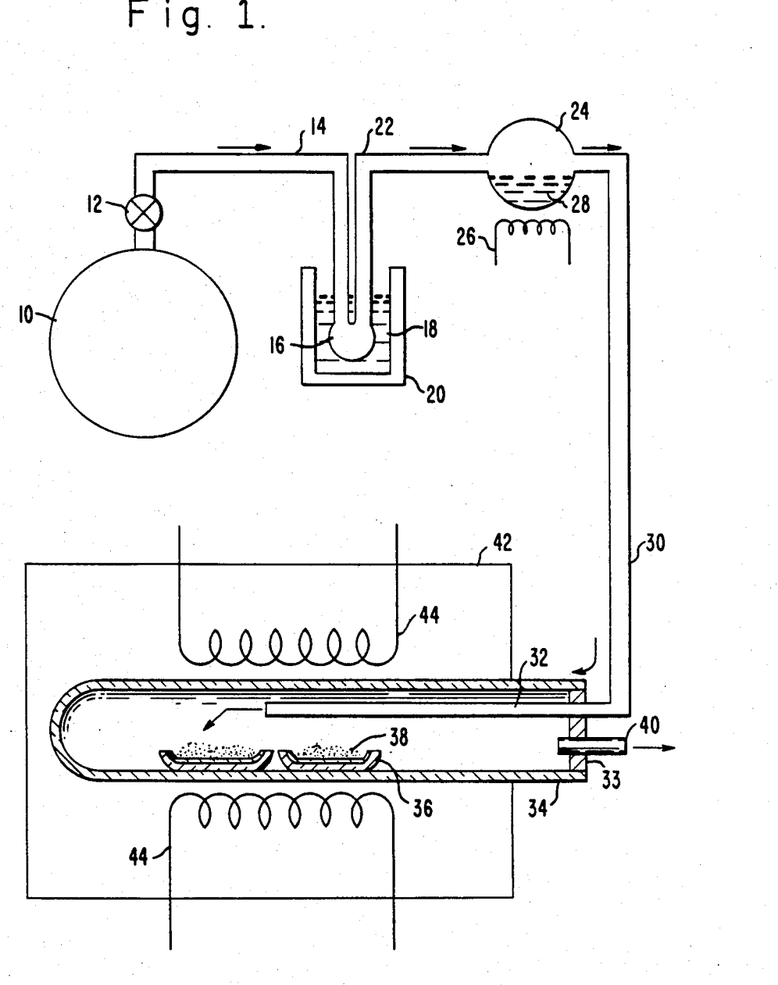
FIG. 1 illustrates, in schematic form, an apparatus suitable for carrying out one process embodiment of the present invention.

In FIG. 1 there is shown, in schematic form, an apparatus suitable for carrying out one process embodiment of the present invention. High purity oxygen (99.99% pure) is provided in a container 10 which is connected to a valve 12, which is connected at its other end to the quartz or pyrex tubing 14. The tubing 14 is connected to a water trap device 16 that is immersed in a mixture of dry ice and acetone 18 in the container 20. The quartz or pyrex tubing 22 which emerges as shown from the exit of the water trap device 16, leads to a quartz or pyrex container 24 which holds iodine ($I_2$) initially in solid form. Upon activation of the heating element 26 which is located near the bottom of the container 24, the solid iodine forms the liquid 28 and is then vaporized. Optionally, the temperature in the container 24 may be controlled to produce sufficient vapor pressure directly from the solid iodine. The iodine vapor mixed with the dried oxygen gas in the container 24 passes through the Teflon tube 30 to a connecting high purity (99.9%) alumina tube 32 which passes through a Teflon or vitreous silica cap 33 and then into a high purity alumina reaction tube 34.

Within the reaction tube 34, there are one or more platinum-lined alumina boats 36 which contain the selected material 38 to be processed. The reaction tube 34 also has a high purity alumina tube 40 through which exhaust gases are removed from the reaction tube 34. The reaction tube 34 is contained within a furnace 42 which has heating elements 44 that can be controlled to raise the temperature in the furnace 42 to a predetermined level at which atomic oxygen and atomic iodine are formed from the molecular oxygen and iodine mixture. The method of use of the apparatus shown in FIG. 1 is described below.

The apparatus shown in FIG. 1 may be altered as required to accomodate the use of other reactive atmospheres, such as a vapor mixture of carbon tetrachloride and dry oxygen.

In accordance with a first process embodiment of the present invention, a powder of a chosen oxide, such as commercially available silica ($SiO_2$), is placed in the alumina boat 36 shown in FIG. 1. The boat 36 is then placed in the reaction tube 34, which is then sealed and placed in the furnace 42. The heating elements 44, which are silicon carbide rods, are activated by applying a controlled voltage thereto, and the temperature of the furnace is raised to a predetermined elevated temperature, such as 1500° C. High purity oxygen is introduced from the container 10 through the valve 12 at a flow rate of 60 to 70 cubic centimeters per minute into the cold trap 16, where residual water is removed from the oxygen by freezing in the dry ice/acetone mixture 18. The dried oxygen is then passed into the container 24 containing iodine vapor. The iodine vapor was produced by activating the heating element 26, which was a nichrome wire, by applying a controlled voltage to this wire, to raise the temperature in the container 24 to approximately 100° C. to vaporize the iodine. The mixture of dry oxygen and iodine comprised approximately 3% iodine in dry oxygen and was passed through the tubes 30 and 32 and over the powder 38 at a flow rate of approximately 1 cubic centimeter per second. The powder 38 is maintained in this reactive atmosphere at approximately 1200° C. for approximately 24 hours. In some cases, temperatures as low as 1000° C. or as high as 1400° C. may be used for reactive atmosphere processing. The improved optical transmission of the silica material produced by the above-described process is discussed below in relation to FIG. 2.

Furthermore, more recent studies have indicated that atomic iodine alone, without oxygen, may be sufficient to accomplish the process of the present invention. The reaction conditions specified above are used, except that the reactive atmosphere comprises atomic iodine mixed with an inert carrier gas, such as helium.

Alternatively, a reactive atmosphere comprising atomic chlorine and atomic oxygen may be used to treat the oxide powder in accordance with this first process embodiment of the present invention. The reaction chamber 34 and associated tubing and heating elements shown in FIG. 1 are used and a mixture of chlorine and oxygen in a predetermined ratio is introduced into the reaction chamber 34 and passed over the oxide powder 38. The powdered oxide is exposed to this reactive atmosphere at 1000° C. for 60 hours.

A convenient source of the required atomic chlorine is the pyrolytic generation from carbon tetrachloride (CCl$_4$), as disclosed in the publication by R. C. Pastor and A. C. Pastor, entitled "Crystal Growth in a Reactive Atmosphere", in *Materials Research Bulletin*, Vol. 10, 1975, pages 117 to 124. However, care must be exercised to avoid the displacement of the oxide by the halide, as shown in Equation (1).

$$MO(c) + X_2 \rightleftharpoons MX_2(c) + \tfrac{1}{2}O_2. \tag{1}$$

where c=condensed state This displacement reaction can be prevented by using a mixture of oxygen and chlorine in a molar ratio greater than 1:1. The effectiveness of this measure depends on the acidic nature of the oxide and has been found to be effective for acidic oxides such as silicon dioxide. However, for a basic oxide, such as a rare earth sesquioxide, it would be difficult to effect hydrogen impurity removal without oxide displacement under moderate values of the molar ratio of oxygen to chlorine. In addition, it has been found that the breakdown of the carbon tetrachloride and oxygen reactive atmosphere to atomic chlorine and atomic oxygen is most effectively accomplished at temperatures of or below 1000° C. Moreover, at temperatures above 1000° C., further oxide displacement occurs since the reaction of Equation (1) in the forward direction is favored.

However, we have discovered that treatment of a rare earth oxide in accordance with the first process embodiment of the present invention, using a reactive atmosphere of chlorine and oxygen, results in quantitative conversion to the oxychloride. For example, lanthanum sesquioxide (La$_2$O$_3$) is converted quantitatively to lanthanum oxychloride (LaOCl), as described in Example 7. The oxychloride so-formed is also water-free.

Furthermore, it is anticipated that bromine may be used as the required halogen atom in the process of the present invention since bromine stands vertically between chlorine and iodine in the periodic table and both of the latter elements are effective in the process of the present invention.

It should be noted that the rate of the reaction of the oxide powder with the reactive atmosphere as described above depends upon both the particle size of the powder (i.e. the surface area) and the temperature, and these two parameters must be optimized. At relatively high temperatures, there is the possibility of melting the powder or altering its surface structure. Therefore, the temperature must be controlled so that the desired surface structure of the powder is maintained.

Figure 2:
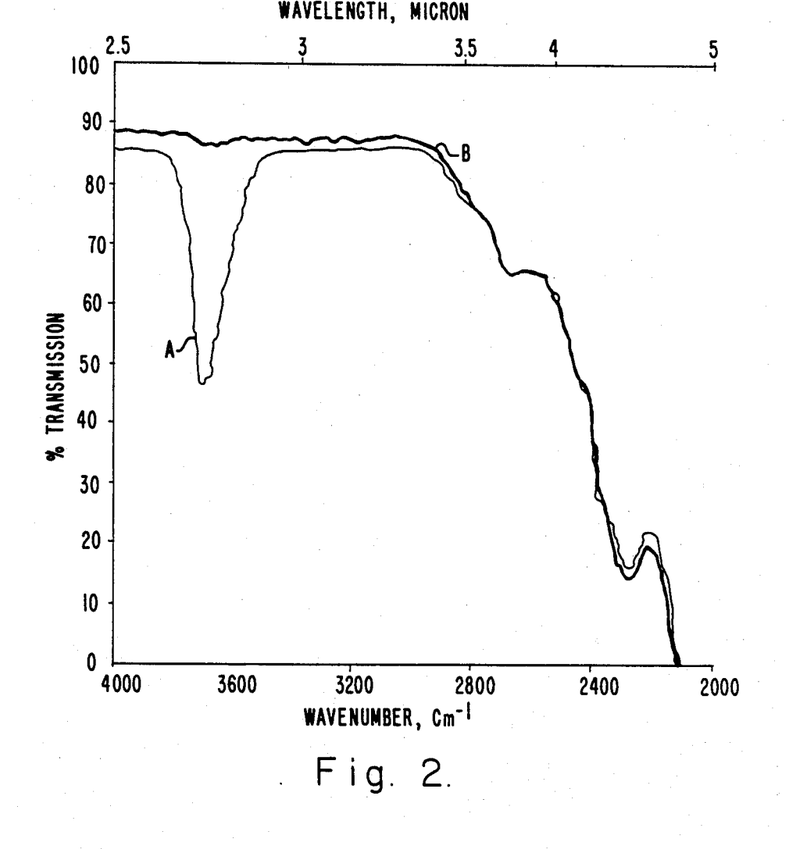
FIGS. 2, 3 and 4 each present the near-infrared transmission curves for a silica sample treated with a specific gas phase reactive atmosphere in accordance with the first process embodiment of the present invention, as compared to the transmission curve for an untreated sample.
Figure 3:
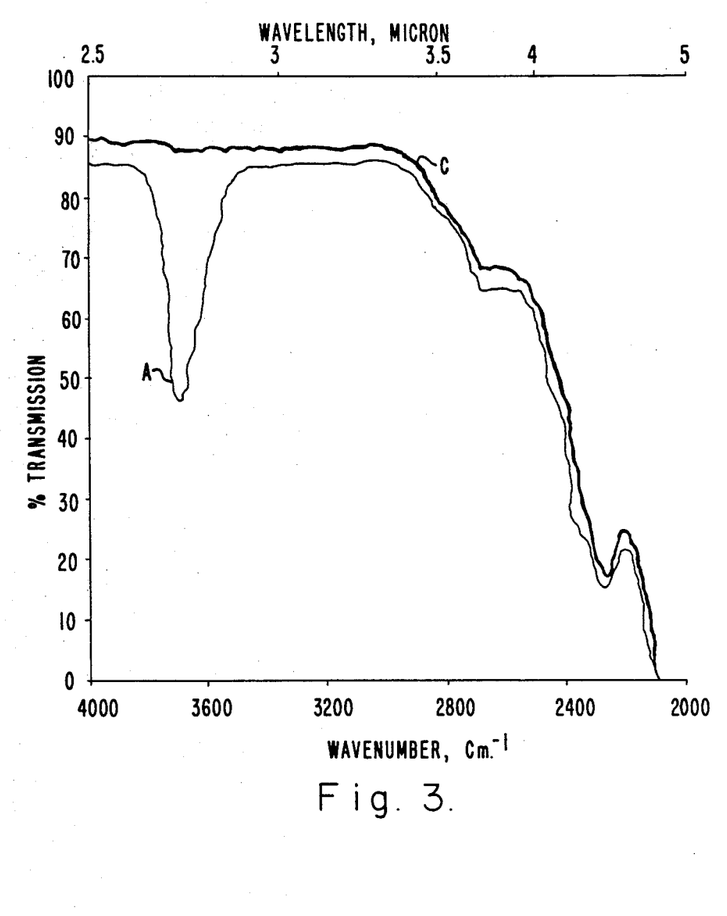
Figure 4:
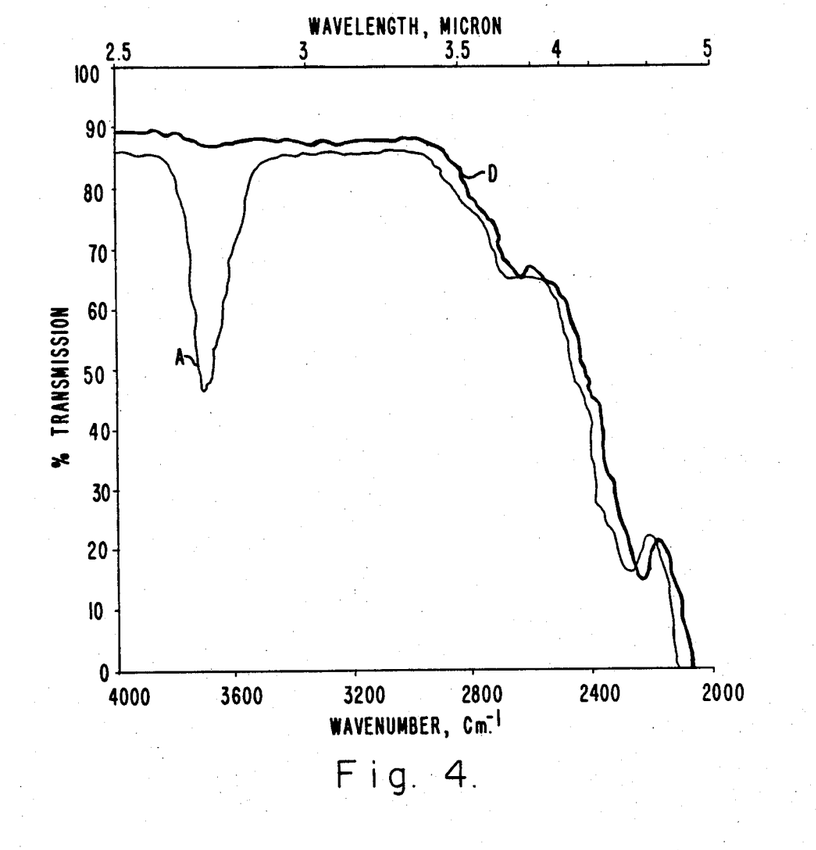

In accordance with the first process embodiment of the present invention, hydrogen impurities which cause unwanted optical absorption peaks are removed from the oxide crystal as illustrated in FIGS. 2, 3, and 4 by exposing the oxide in powder form to a reactive atmosphere comprising halogen atoms.

In FIGS. 2, 3, and 4 there are shown several near-infrared transmission curves for silica samples treated with various gas phase reactive atmospheres in accordance with the present invention, as well as for an untreated silica sample. In order to obtain the transmission curves shown in FIGS. 2, 3, and 4, each silica sample was melted under an inert atmosphere, such as helium, in a furnace at 1900° C., and subsequently cooled. The cooled specimens were ground to a thickness of 2 millimeters and windows were fabricated at each end by rough-grinding in kerosene with emery paper and fine-grinding in kerosene with ceria powder. The optical transmission of each sample in the near-infrared range was measured using a Beckman 12 infrared spectrophotometer.

Curve A shown in each of FIGS. 2, 3, and 4 presents the transmission data for the untreated material, which was silica sold under the tradename Suprasil, obtained from Heraeus-Amersil Inc. of Sayreville, N.J. As seen in Curve A of FIG. 2, for example, the untreated material has a very large absorption at 2.7 micrometers. This absorption is due to the free-hydroxyl groups. These free hydroxyl (OH) groups are produced by the reaction of water with the oxide as shown in Equation (2) below, whereby the hydrogen impurity bonds essentially to one oxide ion in the oxide crystal structure.

$$MO + aH_2O \rightarrow MO_{1-a}(OH)_{2a}. \tag{2}$$

where a $<<$ 1

In addition to the free-OH group, bonding of a hydrogen atom impurity between two neighboring oxide atoms in the oxide lattice forms various hydrogen-bond species $O^{-2}$—$H^+$ ... $O^{-2}$, which add absorption bands at longer wavelengths, e.g. 3.7 and 4.4 micrometers. The latter two wavelengths are considered to be due to hydrogen bonded —OH, as discussed in the publication entitled "Water in Silica Glass," by A. J. Moulson and J. P. Roberts, in the *Transactions of the British Ceramic Society*, Vol. 59, 1960, at page 388. Consequently, in the oxide, hydrogen impurities range from free-OH to the various hydrogen-bond species, and both produce unwanted absorption bands. Thus, hydrogen impurities in the oxide must be removed in the form of hydroxyl ions.

In Curve B of FIG. 2, there is shown the transmission data obtained for silica powder treated in accordance with the first process embodiment of the present invention using a reactive atmosphere of iodine and oxygen at 1200° C. for 24 hours as previously described in relation to FIG. 1. In Curve B of FIG. 2, the optical absorption of the sample at 2.7 micrometers has been greatly reduced as compared to the untreated oxide shown in Curve A of FIG. 2.

Turning now to FIG. 3, Curve C shows the transmission data obtained for a silica sample treated with carbon tetrachloride and oxygen at 1000° C. to form atomic chlorine and atomic oxygen, for 60 hours in accordance with the first process embodiment of the present invention. In Curve C of FIG. 3, the optical absorption of the sample at 2.7 micrometers has likewise been greatly reduced as compared to the untreated oxide, shown in Curve A of FIG. 3. It is understandable that the temperature required for effecting the process of the present invention is lower for chlorine than iodine since the chlorine atom has an average radius which is 25 percent smaller than that of the iodine atom, which permits easier access to the oxide crystal structure.

In FIG. 4, Curve D shows the transmission data obtained for a silica sample treated with oxygen alone at 1500° C. for 36 hours. As shown in Curve D, the optical absorption of the sample at 2.7 micrometers has been reduced as compared to the untreated oxide shown in Curve A of FIG. 4. However, as compared to the two process embodiments of the present invention discussed above in relation to Curve B of FIG. 2 and Curve C of FIG. 3, a much higher temperature and longer soak period is required for treatment with oxygen alone. These results indicate that oxygen alone is not responsible for accomplishing the process of the present invention.

Thus, in accordance with the first process embodiment of the present invention, a halogen atom is used to remove hydrogen impurities from the oxide crystal network by displacing the hydroxyl ion, as shown in Equation (3) below.

The free hydroxyl species so formed diffuses through the oxide crystal, volatilizes as an unreacted species or as the reacted species XOH, and is removed from the crystal.

However, the halide ion formed in Equation (3) would upset the stoichiometry of the oxide crystal and consequently must be removed. This is accomplished, in accordance with one process embodiment of the present invention, by reacting the atomic oxygen in the reactive atmosphere with the halide ion as shown in Equation (4) below, to release halogen gas and thus restore the stoichiometry of the oxide crystal.

In the alternative embodiment of this invention using iodine and helium as the reactive atmosphere, the halide ion formed in Equation (3) reacts with excess silicon from $SiO_2$, for example, to form a silicon tetrahalide which volatilizes, and thus restores the oxide crystal stoichiometry. However, this latter reaction has been found to produce a weight loss of 10 to 20 percent in the product. Consequently, this embodiment of the present invention is most suited for treating oxide powders with a low concentration of hydroxyl impurities.

The preparation of water-free fused silica and of water-free lanthanum sesquioxide ($La_2O_3$) in accordance with this process embodiment of the present invention are described in Examples 1, 2, and 3 below.

Water-free silica formed by this process embodiment of the present invention may be fused and formed into an optical component, such as a laser window, or may be formed into optical fibers with near-infrared transparency. Moreover, water-free silica and other water-free oxides formed by the process of the present invention may be used as the starting material for crystal growth of near-infrared transmissive materials used in solid state lasers and non-linear electro-optical applications. Thus, the process of the present invention may be used to form improved optical components in either vitreous or crystalline form. The silica formed by the process of the present invention has improved near infrared transmission as compared to commercially available silica, as discussed in relation to FIGS. 2 and 3 herein. In addition, the present invention offers a significant economic advantage since the starting material used herein is relatively inexpensive as compared to the quartz material which has frequently been used in the past to form fused silica.

Furthermore, using the first process embodiment of the present invention in which vitreous silica powder is treated with a reactive atmosphere of iodine and oxygen or iodine and helium, we discovered that the vitreous silica powder is transformed to $\beta$-cristobalite, which, upon cooling transforms to $\alpha$-cristobalite. In the past, it has been recognized that $\alpha$-cristobalite is an unstable phase which transforms to $\beta$-cristobalite at 230° to 260° C., with the latter having a melting point of 1705° C., as set forth in H. Remy's "Treatise on Inorganic Chemistry", referenced above, in Volume I, at page 490. However, the silica powder treated with iodine and oxygen or iodine and helium in accordance with the present invention did not melt in the chosen reactive atmosphere after a 5-hour soak at 1800° C. Upon cooling, this material was identified as $\alpha$-cristobalite as discussed below in relation to FIG. 5.

Figure 5:
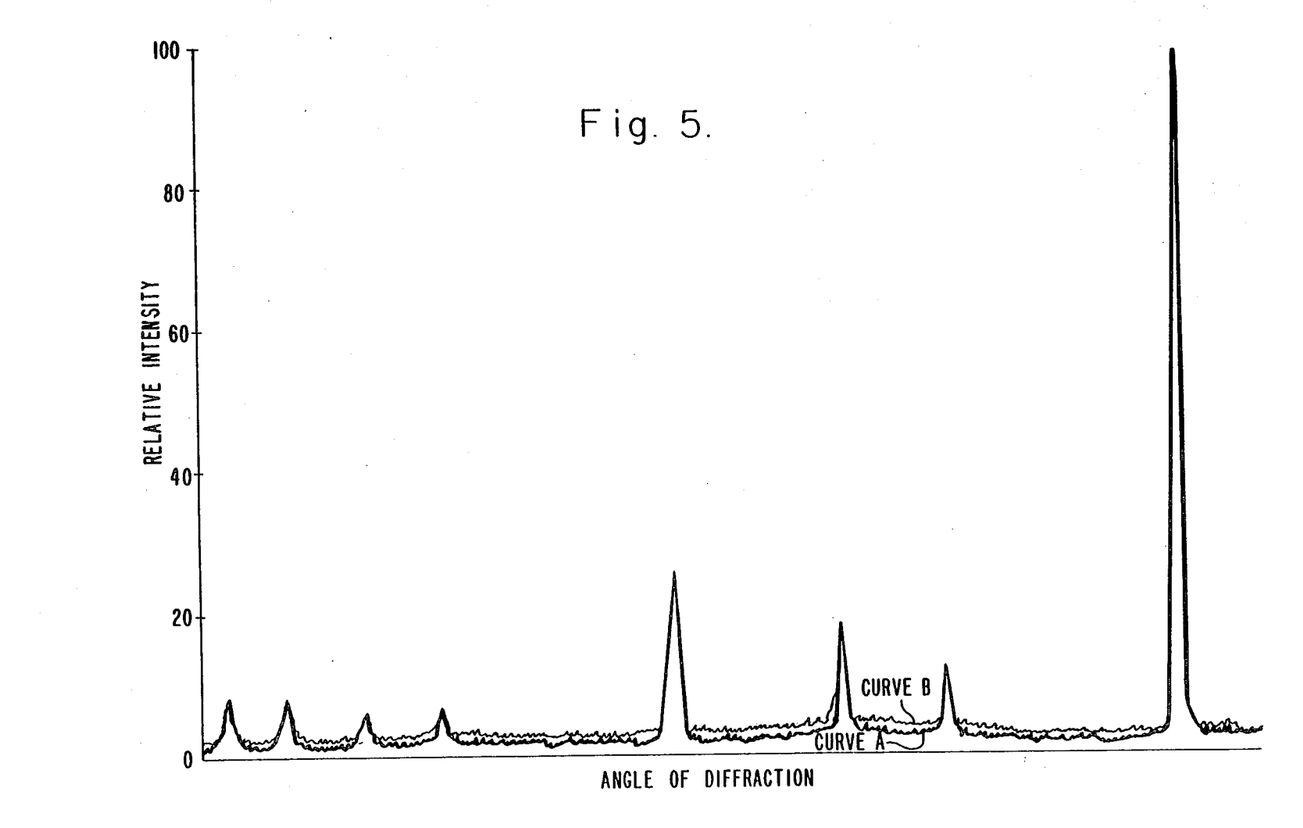
FIG. 5 presents the x-ray diffraction analysis data obtained for conventional α-cristobalite powder and for the silica powder after treatment in accordance with the first process embodiment of the present invention.

FIG. 5 presents the data obtained on two separate samples, using x-ray diffraction analysis, as described, for example by Harold P. Klug and Leroy E. Alexander in the book entitled "X-ray Diffraction Procedures for Polycrystalline and Amorphous Materials", John Wiley and Sons, July 1962. Each curve shown in FIG. 5 presents the relative intensities of x-ray diffraction lines for various diffraction angles. The units shown are arbitrary since the purpose here is to merely compare two curves. Curve A presents the x-ray diffraction data for conventional $\alpha$-cristobalite prepared by heating vitreous silica powder in a water and oxygen environment at 1400° C. for 22 hours, as discussed by N. G. Ainslie, J. D. Mackenzie, and D. Turnbull, in the publication entitled "Melting Kinetics of Quartz and Cristobalite," in the *Journal of Physical Chemistry*, Vol. 65, 1961, page 1718 et seq. Curve B presents the x-ray diffraction data for the silica powder after treatment in accordance with the present invention with a reactive atmosphere of iodine and oxygen at 1400° C. for 22 hours. Curves A and B were intentionally offset in order to be able to distinguish two separate curves. As can be seen in FIG. 5, the position of the peaks in Curves A and B coincides at all points on the curve, which indicates that the material used to generate Curve B is $\alpha$-cristobalite. Thus, it has been shown that the powder treated in accordance with the present invention and subsequently cooled has been transformed from vitreous silica to $\alpha$-cristobalite. However, it is known that at temperatures in excess of 260° C.; $\alpha$-cristobalite is transformed to $\beta$-cristobalite. Consequently, at the elevated temperature used to treat the powder in accordance with the present invention, the treated powder is in the form of β-cristobalite. Upon cooling, the latter transforms to α-cristobalite, which is indicated in Curve B of FIG. 5.

Figure 6:
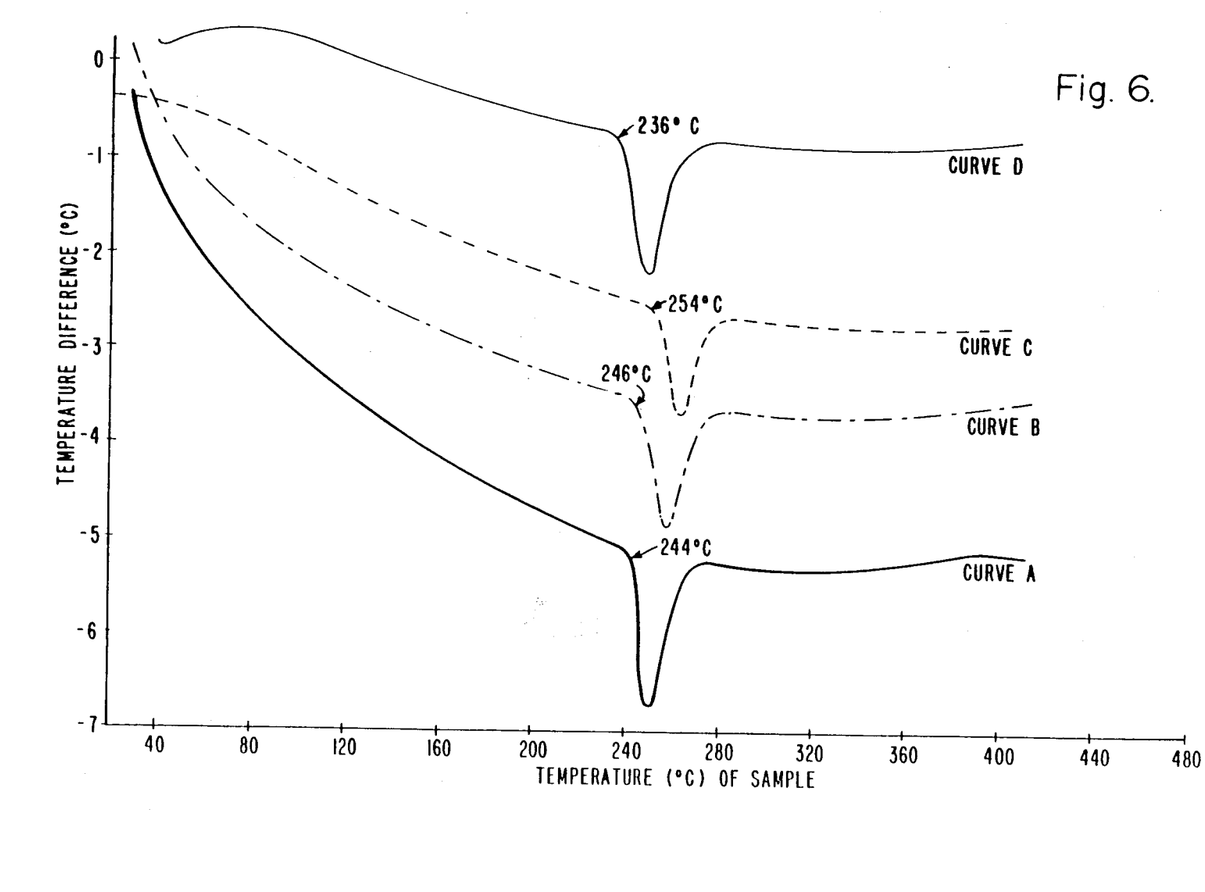
FIG. 6 presents the differential thermal analysis data for vitreous silica samples formed by various processes, including the first process embodiment of the present invention.

In order to further characterize the powder resulting after treatment with iodine and oxygen in accordance with the first process embodiment of the present invention, differential thermal analysis (DTA) was performed to determine the temperature at which the transition from α-cristobalite to β-cristobalite occurs. The differential thermal analysis was performed as described, for example, by Wesley W. Wendlandt, in the book entitled "Thermal Methods of Analysis," Wiley and Sons, second edition, 1974. Each curve in FIG. 6 shows the temperature difference between the sample and the reference material, such as aluminum oxide, versus the temperature of the sample. The curves, shown in FIG. 6 were intentionally offset for ease of comparison. For each of the curves shown in FIG. 6, the same sample size (32.27 milligrams) and the same sample heating rate (50 degrees per minute) were used. The sharp drop shown in each curve in FIG. 6 is due to the consumption of heat energy required for the material to transform from α-cristobalite to β-cristobalite. Curve A presents the DTA data for the material formed by heating vitreous silica in an atmosphere of water and oxygen at 1400° C. for 22 hours in accordance with a known process, and shows a transition temperature of 244° C. Curve B presents the DTA data for the material formed by heating vitreous silica in an atmosphere of iodine and a helium carrier gas at 1400° C. for 16 hours in accordance with an alternative process embodiment of the present invention, and shows a transition temperature of 246° C. Curve C presents the DTA data for the material formed by heating vitreous silica in an atmosphere of iodine and oxygen at 1200° C. for 22 hours in accordance with a preferred process embodiment of the present invention, and shows a transition temperture of 254° C. Curve D presents the DTA data for the material formed by heating vitreous silica in helium at 1400° C. for 16 hours, and shows a transition temperature of 236° C. Thus, the material formed by treating vitreous silica powder in accordance with the present invention has a higher transition temperature, as indicated in Curves B and C, than that of a conventional cristobalite material, as indicated in Curve A. In the preferred embodiment of the present invention, using an atmosphere of iodine and oxygen, the transition temperature of the cristobalite material so formed is 10° C. higher than that of the conventional cristobalite material. This result indicates that the cristobalite formed in accordance with the present invention is a more thermally stable material than conventional cristobalite known heretofore, and requires a higher temperature in order to produce the lattice rearrangement and transition from the α-form to the β-form.

The mechanism for the above-described transition of vitreous silica in powder form to cristobalite in accordance with the present invention is believed to be as follows. Once the vitreous silica has been freed of water impurities by the process of the present invention and is subsequently held at a temperature as low as 1200° C., the atoms in the silica crystal structure undergo a rearrangement from the amorphous (i.e. non-crystalline) structure of vitreous silica to the crystalline structure of β-cristobalite. This β-cristobalite in powder form was not identified per se since, upon cooling below 260° C., this β-cristobalite transforms further to α-cristobalite.

Furthermore, by melting and then cooling the water-free cristobalite powder prepared by treatment of silica powder with iodine and oxygen in accordance with the present invention and maintained in an atmosphere free of water vapor, there is formed a new material comprising vitreous silica formed from the crystalline α-cristobalite powder of the present invention. This fused cristobalite is a lower free-energy form of silica and is therefore more stable than the vitreous silica ordinarily encountered, as further discussed in relation to FIG. 7 below.

Figure 7:
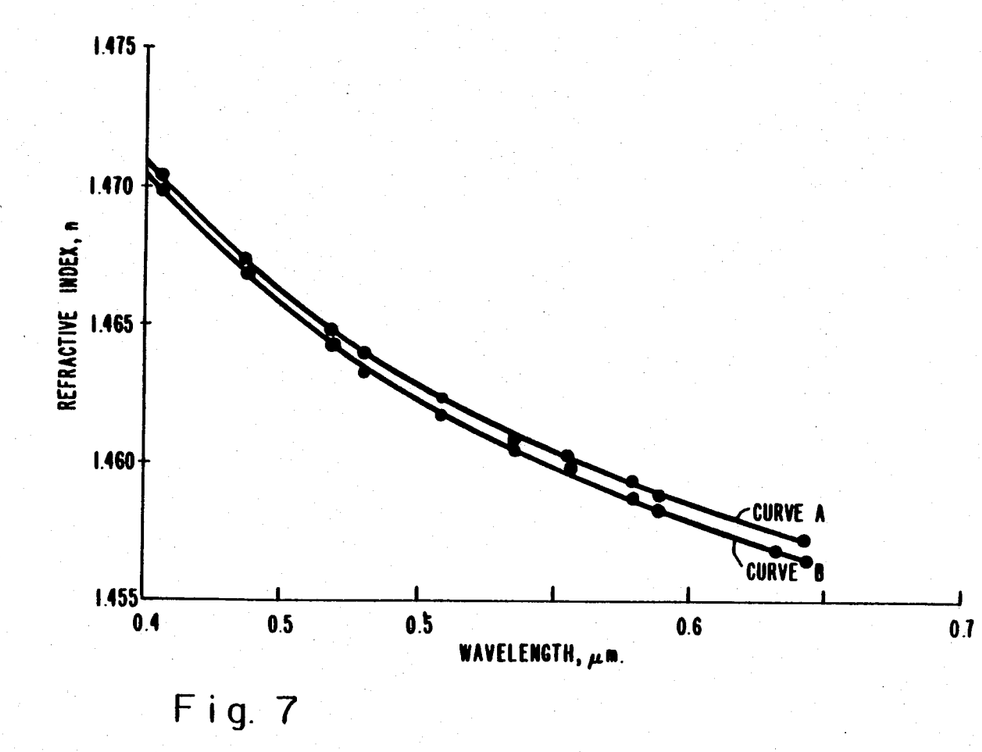
FIG. 7 shows the refractive index versus wavelength for fused cristobalite formed in accordance with the first process embodiment of the present invention and for fused commercial silica.

In FIG. 7 there is shown the refractive index versus wavelength for fused cristobalite formed in accordance with the first embodiment of the present invention (Curve A) and for fused commercially available silica sold under the trade name of Suprasil (Curve B). The refractive index was determined as described, for example, by R. A. Houston, in the book entitled "College Manual of Optics," in the chapter entitled "A Treatise on Light," Longmans, Green and Company, seventh edition, 1952. As can be seen in FIG. 7, the refractive index of the fused cristobalite of the present invention is higher at all measured wavelengths than the refractive index of fused commercial silica. This result indicates that the fused cristobalite of the present invention has a more compact structure or more densely packed network than conventional fused silica known heretofore.

Furthermore, the fused cristobalite of the present invention has a higher melting point than conventional cristobalite, i.e. higher than 1800° C. as compared to 1705° C. reported by Remy referenced above. This higher melting point indicates further that the fused cristobalite of the present invention is more thermally stable than conventional vitreous silica.

In addition, results have been obtained which indicate that upon melting and then cooling the cristobalite powder formed from vitreous silica powder in accordance with the present invention, the material so formed is in the vitreous state, rather than a crystalline state. The results described by N. G. Ainslie, C. R. Morelock, and D. Turnbull, in the publication entitled "Devitrification Kinetics of Fused Silica," in the *Journal of the American Ceramic Symposium*, 1962, indicate that the rate of devitrification (or crystallization) of the silica glass to β-cristobalite increases with increased temperature, but drops sharply to zero as the melting point of 1710° C. is approached. The results of Ainslie et al suggest that when a melt of vitreous silica is cooled below the freezing point required for nucleation (i.e. is undercooled), the devitrification rate is small. Thus, when a melt of silica is undercooled, solidification in the vitreous state is favored over crystallization.

Further indication of the melting behavior of silica is provided by the work of N. G. Ainslie, J. D. Mackenzie, and D. Turnbull, in the publication entitled "Melting Kinetics of Quartz and Cristobalite", previously referenced herein, which reports that the fusion rate of quartz is 6 micrometers per minute at 1750° C. If it is assumed that the fusion rate of the material formed by treating silica powder in accordance with the present invention is relatively close to that for quartz, the extent of fusion after a five-hour soak at 1800° C. in accordance with the present invention would be greater than one millimeter. Even though this latter dimension is at least one order of magnitude larger than the particle size of the powder resulting after treatment in accordance with the present invention, the latter material did not melt at 1800° C.

Turning now to a consideration of a second process embodiment of the present invention, a water-free oxide powder is formed by providing a water-free environment during the formation of the metal or non-metal oxide, which prevents the inclusion of water impurities in the oxide as formed. A chosen nonpolar, or even hydrophobic, compound which lacks affinity for water and which contains the selected metal or non-metal, such as silicon tetrachloride or germanium tetrachloride, is reacted with a chosen aprotic oxygen-containing compound, such as dimethylsulfoxide, to form a metal or non-metal oxide-containing precipitate. This reaction is carried out in a chosen aprotic solvent, such as carbon tetrachloride or dimethylformamide, which provides a liquid that excludes water from the environment during the formation of the metal oxide and, therefore, prevents inclusion of water and water-derived impurities in the metal oxide as formed. The precipitated metal oxide is separated from the solvent by centrifuging, distillation under water-free conditions, or flushing with an inert gas such as helium or nitrogen. Then, the oxide is subjected to reactive atmosphere processing in accordance with the first process embodiment of the present invention as described above, to remove any traces of water and water-derived impurities and to provide a water-free oxide material. The traces of water removed may arise from the decomposition of any excess organic reactant (e.g. dimethylsulfoxide) which was not completely removed from the precipitate. In addition, traces of water may arise by outgassing from the walls of the apparatus, which occurs continuously during processing of the oxide material at elevated temperature. A preferred reactive atmosphere in this embodiment of the present invention is iodine and helium, as previously described herein. The formation of water-free silica and water-free germanium oxide by this process embodiment of the present invention are described in Examples 4 and 5 below. Further, it is anticipated that water-free oxides formed by this second process embodiment of the present invention may be fused and formed into optical components as previously described with respect to the water-free oxides formed by the first process embodiment of this invention.

In accordance with a third process embodiment of the present invention, a water-free metal or non-metal oxide material is produced by forming the oxide by a chemical reaction in the presence of a chosen material which functions as a getter to remove water (in the form of hydrogen ions and hydroxyl ions) during the oxide formation. The starting material is an organic compound containing a number of oxygen-containing groups which are bonded through the oxygen atoms to a single atom of the metal or non-metal to be formed into the oxide, such as tetraethylorthosilicate [Si(OC₂H₅)₄], or silicon tetraethoxide, or the tetraalkoxides of titanium, germanium, and zirconium, or aluminum isopropoxide. This starting material is reacted with an organic acid anhydride, such as trifluoroacetic anhydride [(CF₃CO)₂O], whereby the first oxygen-containing groups of the starting material (e.g. the alkoxy groups C₂H₅O) are replaced with second oxygen-containing groups derived from the anhydride (e.g. the acetate groups CF₃CO₂) to form the intermediate product, as shown in Equation (5) below, for the case of the tetraethoxide of M, where M is silicon, germanium, or zirconium, for example.

Intermediate Product

However, in the particular case where M is silicon, it has been determined that the molar ratio of alkoxy: acetate ($C_2H_5O:CF_3CO_2$) is not 4:8 as would be expected from Equation (5), but is 4:10, and that at least 20 percent of the acetate group must be provided in the form of trifluoroacetic acid, $CF_3COOH$.

The ester by-product of Equation (5), such as an ethyl trifluoroacetate, is removed from the precipitated intermediate product by distillation. The intermediate product of Equation (5) is then decomposed by heating, to 170° for a few hours, for example, to form the desired oxide, $MO_2$, e.g. silica, as shown in Equation (6) below. A second product of this decomposition is the starting material organic acid anhydride, such as trifluoroacetic anhydride, which provides a reactive atmosphere to protect the oxide residue from water.

The regenerated trifluoroacetic anhydride so formed reacts readily with water to form trifluoroacetic acid as shown in Equation (7) below.

Thus, any traces of water present while the $SiO_2$ is being formed in accordance with the reaction of Equation (6) are removed by reaction with the regenerated anhydride, which is being simultaneously formed, and these traces of water are not incorporated in the $SiO_2$ crystal structure. These traces of water may arise from low levels of water contamination in the alkoxide reactant or by outgassing from the walls of the apparatus. The preparation of water-free silica by this process embodiment of the present invention is described below in Example 6. Further, it is anticipated that water-free oxides formed by the third process embodiment of the present invention may be fused and formed into optical components as previously described with respect to the first process embodiment of this invention.

EXAMPLE 1

This example illustrates the preparation of water-free silica ($SiO_2$) in accordance with the first process embodiment of the present invention previously described herein. Silica sold under the tradename of Suprasil and obtained from Heraeus-Amersil Inc. of Sayreville, N.J. was powdered and the fraction that passed through a 200-mesh sieve was used as the starting material. The powder was placed in a closed reaction chamber of the type shown in FIG. 1 as chamber 34 and was subjected to a reactive atmosphere of chlorine and dry $O_2$ at a flow rate of 1 cubic centimeter per second at 1000° C. for a period of 60 hours. The chlorine was generated by the pyrolytic decomposition of carbon tetrachloride in oxygen carrier gas in the ratio of about or slightly less than 1:10, as previously described herein. The carrier flowed at the rate of 1 cubic centimeter per second and was saturated with the vapor in equilibrium with carbon tetrachloride liquid at 25° C. The mixture was passed through a calcination chamber (e.g. a 2-inch inside diameter alumina tube) at 1000° C. and of such volume that the residence time was $10^3$ seconds. Under these conditions, the steady-state concentration of chlorine was $10^{-6}$ gram-atom pr cubic centimeter.

The treated powder was transferred, under a blanket of helium to maintain a water-free environment, into a tungsten container and loaded into an Astro furnace, from Astro Industries of Santa Barbara California. After repeated purgings with helium, the furnace was heated under a throttled flow of helium. The assembly was heated to approximately 1900° C., held at that temperature for 15 minutes, and then cooled. The residence time at the melt temperature needs to be long enough to permit bubbles to rise to the surface of the melt and escape, so that a sample of clear glass is formed upon cooling. The specimen of fused silica so formed was rough ground with kerosene and emery paper, progressing in stages from 240 to 600 grit. The final polish was carried out in a lapping wheel with kerosene and ceria powder. The transmission of the polished 2 millimeter-thick specimen in the near-infrared range was determined and the spectrum shown in FIG. 3, Curve C was produced, as previously discussed herein. Treatment of the silica powder in accordance with the process of the present invention resulted in removal of the optical absorption peak at 2.7 micrometer, which indicates complete removal of the free-hydroxyl group from the oxide material.

EXAMPLE 2

A sample of Suprasil was treated as described with respect to Example 1, except that the reactive atmosphere comprised iodine and dry oxygen as previously described herein and the powder was maintained in this reactive atmosphere at 1200° C. for approximately 24 hours. The apparatus shown in FIG. 1 was used to generate the atomic oxygen and atomic iodine for reactive atmosphere processing of the powder as previously discussed herein. The treated sample was maintained in a water-free environment by blanketing with helium and was melted and then cooled to form a specimen of fused silica, which was polished as described in relation to Example 1. The spectrum shown in FIG. 2, Curve B indicates the near-infrared transmission of the treated sample and shows the removal of the free-hydroxyl absorption peak at 2.7 micrometers. In addition, it was determined that the powder so produced had a melting point in excess of 1800° C. and was, in fact, shown by x-ray diffraction analysis to be α-cristobalite, as previously discussed herein.

EXAMPLE 3

This example illustrates the preparation of water-free lanthanum sesquioxide ($La_2O_3$) in accordance with the first process embodiment of the present invention previously described herein. Commercially available $La_2O_3$ powder, from Aldrich Chemical Company Inc. of Milwaukee, Wis., was treated with a reactive atmosphere of iodine and oxygen as described in Example 2 for silica. The $La_2O_3$ powder was kept at 1000° C. in the reactive atmosphere for 24 hours.

An accelerated test of environmental stability was performed by exposing the treated powder to 100 percent humidity at 24° C., and it was determined that the treated powder had a quiescent (induction) period of 3 hours before it began taking up water from the vapor phase. In addition, after the induction period, water uptake was at a relatively slow rate. This result is to be compared to a reference $La_2O_3$ sample calcined in oxygen alone at 1000° C. for 24 hours, which had an induction period of less than one hour, after which the rate of water uptake exhibited a sharp rise. These results indicate that the $La_2O_3$ powder treated in accordance with the process of the present invention is a more stable material than the commercially available material.

EXAMPLE 4

This example illustrates the preparation of water-free silica in accordance with the second process embodiment of the present invention previously described herein. Dimethylsulfoxide was introduced inside a three-necked flask. Under a flow of nitrogen, a solution of silicon tetrachloride ($SiCl_4$) in carbon tetrachloride ($CCl_4$) liquid was introduced dropwise from a separatory funnel. The flask was kept in an ice bath and the mixture was constantly stirred with a magnetic bar. The white precipitate which contained the silica was collected and subjected to reactive atmosphere processing as described in Example 1. The product was identified by x-ray diffraction analysis to be silica.

EXAMPLE 5

Water-free germanium dioxide ($GeO_2$) was prepared from dimethylsulfoxide and germanium tetrachloride ($GeCl_4$) in $CCl_4$ liquid using the process described in Example 4 for silica preparation. The precipitate was collected and subjected to reactive atmosphere processing as described in Example 1.

EXAMPLE 6

This example illustrates the preparation of water-free silica in accordance with the third process embodiment of the present invention previously described herein. Tetraethylorthosilicate, obtained from Aldrich Chemical Company Inc. of Milwaukee, Wis., was placed in a reaction flask and an excess of trifluoroacetic anydride and 20 percent trifluoroacetic acid was added. A translucent gel formed which contained the water-free silica. The supernatant liquid was removed by means of a syringe and needle, and the residue was dried by passing a current of nitrogen over it. The resulting material was identified by x-ray diffraction analysis to be silica.

The process described above has also been used to prepare germanium dioxide, using germanium tetraethoxide as the starting material and trifluoroacetic anhydride as the reactant. In addition, it is anticipated that the water-free oxides of such metals as aluminum, zirconium and titanium may be prepared by this process.

EXAMPLE 7

This example illustrates the preparation of water-free lanthanum oxychloride (LaOCl) powder in accordance with the first process embodiment of the present invention. A sample of lathanum sesquioxide ($La_2O_3$) powder was exposed to a reactive atmosphere of chlorine and oxygen as described in Example 1 for a silica sample, except using a soak time of 24 hours. A weight gain in the product was observed and x-ray diffraction analysis indicated complete conversion to lanthanum oxychloride.

Similarly, oxychlorides of praseodymium and of terbium were also obtained using praseodymium oxide powder ($Pr_2O_3.4PrO_2$) and terbium oxide powders ($Tb_2O_3.2TbO_2$ and separately $Tb_2O_3.3.7TbO_2$) as the starting material. It is anticipated that similar results would be obtained with any of the rare earth oxides.

While the present invention has been particularly described with respect to the preferred embodiments thereof, it will be recognized by those skilled in the art that certain modifications in form and detail may be made without departing from the spirit and scope of this invention. In particular, the present invention is not limited to the preparation of the particular oxides described herein, but is intended to include: silicates (from $SiO_2$); phosphates (from $P_2O_5$), borates (from $B_2O_3$), aluminates (from $Al_2O_3$) and mixtures thereof; binary metal oxides such as yttrium aluminum oxide ($YAlO_3$) yttrium aluminum garnet ($Y_3Al_5O_{12}$), yttrium vanadate ($YVO_4$), beryllium aluminate or chrysoberyl ($BeAl_2O_4$), lithium niobate ($LiNbO_3$); and oxides of the elements of the lanthanide (Ln) series ($Ln_2O_3$). In addition, the process of the present invention applies to the preparation of crystalline oxides as well as glassy oxides. Further, it is intended to include in the process of the present invention other means for forming the reactive atmosphere comprising atomic halogen in addition to the particular process described herein.

What is claimed is:

1. A process for the preparation of a water-free oxide of silicon or germanium comprising the steps of:

(a) reacting a nonpolar chloride compound containing said silicon or germanium with dimethylsulfoxide to form a precipitate containing said oxide, in a nonaqueous aprotic liquid solvent selected from the group consisting of carbon tetrachloride and dimethylformamide, which provides a water-free environment during the formation of said oxide, to prevent the inclusion of water-derived impurities in said precipitate;

(b) separating said precipitate formed in step "a" from said solvent under water-free conditions; and (c) exposing said precipitate to a gas phase reactive atmosphere comprising atomic halogen for a predetermined period of time of about 24 hours or more at a predetermined elevated temperature or about 1000° C. or higher to produce a chemical reaction between said atomic halogen and traces of water and water-derived impurities in said precipitate, to thereby remove said impurities and provide said water-free oxide.

2. The process as set forth in claim 1 wherein:

(a) said oxide is silica ($SiO_2$);

(b) said nonpolar chloride compound is silicon tetrachloride ($SiCl_4$); and (c) said aprotic nonaqueous solvent is carbon tetrachloride.

3. The process as set forth in claim 1 wherein:

(a) said oxide is germanium dioxide ($GeO_2$);

(b) said nonpolar chloride compound is germanium tetrachloride ($GeCl_4$); and (c) said aprotic nonaqueous solvent is carbon tetrachloride.

4. The process set forth in claim 1 wherein said atomic halogen is formed from a mixture selected from the group consisting of a vapor mixture of iodine ($I_2$) and oxygen ($O_2$) comprising approximately 3 percent iodine in dry oxygen; a vapor mixture of carbon tetrachloride ($CCl_4$) and dry oxygen in a predetermined ratio to provide an oxygen-to-chlorine molar ratio greater than 1:1; and a vapor mixture of iodine and an inert carrier gas.

5. The process set forth in claim 1 wherein:

(a) said atomic halogen comprises atomic iodine formed from a vapor mixture of iodine and helium;

(b) said elevated temperature is approximately 1200° C.; and (c) said period of time is approximately 24 hours.

* * * * *